March 2, 1926.

G. K. THOMPSON

CAR TRUCK

Filed April 2, 1925

Inventor
George K. Thompson
By his Attorneys

March 2, 1926.
G. K. THOMPSON
CAR TRUCK
Filed April 2, 1925   2 Sheets-Sheet 2
1,575,136
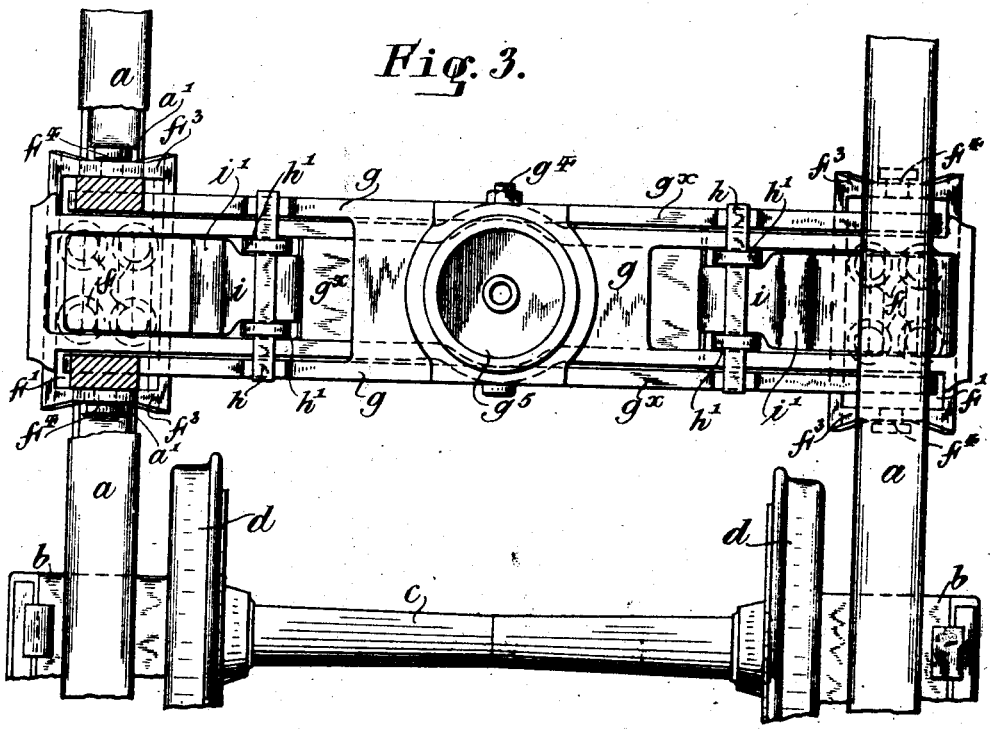
Fig. 3.
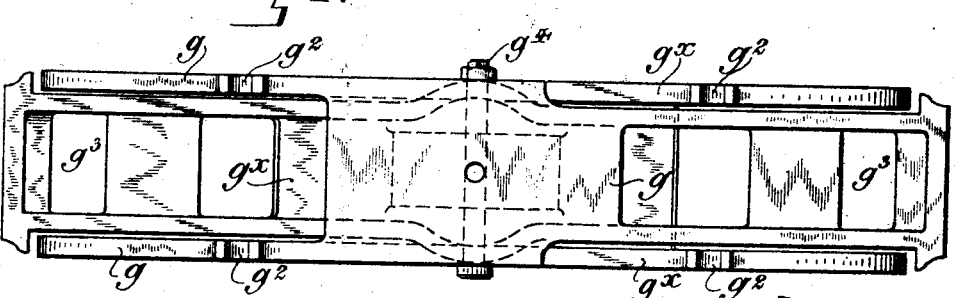
Fig. 4.
Fig. 5.
Inventor
George K. Thompson Patented Mar. 2, 1926.

1,575,136

UNITED STATES PATENT OFFICE.

GEORGE K. THOMPSON, OF SUMMIT, NEW JERSEY.

CAR TRUCK.

Application filed April 2, 1925. Serial No. 20,022.

*To all whom it may concern:*

Be it known that I, GEORGE K. THOMPSON, a citizen of the United States, residing at No. 1 Parmley Place, Summit, New Jersey, have invented certain new and useful Improvements in Car Trucks, of which the following is a specification, reference being had to the accompanying drawings, forming a part hereof.

This invention relates to car trucks of the general character of those shown in Letters Patent of the United States No. 1,211,789, January 9, 1917, and No. 1,392,721, October 4, 1921, and has for its object to provide improved means for distributing the pressure of the load, for preserving parallelism of the car body with the truck axles under varying conditions of load and of road bed, for reducing the extent of movement of the car body with respect to the truck under the influence of inequalities of track, for cushioning the car body, and for securing a three-point bearing between the car body and the truck.

The invention will be more fully described hereinafter with reference to the accompanying drawings in which it is illustrated and in which—

Figure 3 is a top view of a portion of the truck.

Figure 4 is a detail view in elevation, and partly in section, of the load distributing levers.

Figure 5 is a top view of the load distributing levers.

The truck frame, of which only the side frames $a$ are indicated, may be of any usual or suitable construction, modified only so far as may be necessary to accommodate the particular embodiment of the present invention chosen for application thereto. It is provided with suitable journal boxes $b$ to receive the axles $c$ with the wheels $d$. The car body, not shown, may be provided with a body bolster $e$ for cooperation with each truck, such bolster having a central bearing at $e'$ on the truck mechanism, and two side bearings at $e^2$, as hereinafter described.

The chosen embodiment of the invention is illustrated as applied to a four-wheeled truck, commonly used for freight service, provided with coiled bolster springs $f$ which are carried by the side frames $a$, but it will be evident, as this description proceeds, that the invention is applicable also to six-wheeled trucks, commonly used for passenger service and generally equipped with leaf springs.

Figure 1:
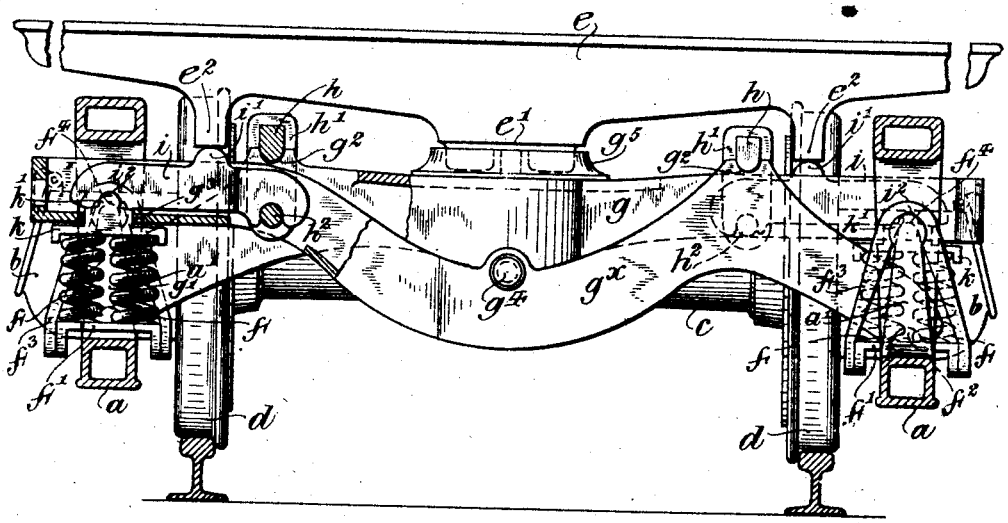
Figure 1 is a view in transverse section of a car truck which embodies the invention, a portion of the body bolster being also shown and broken out to save space.
Figure 2:
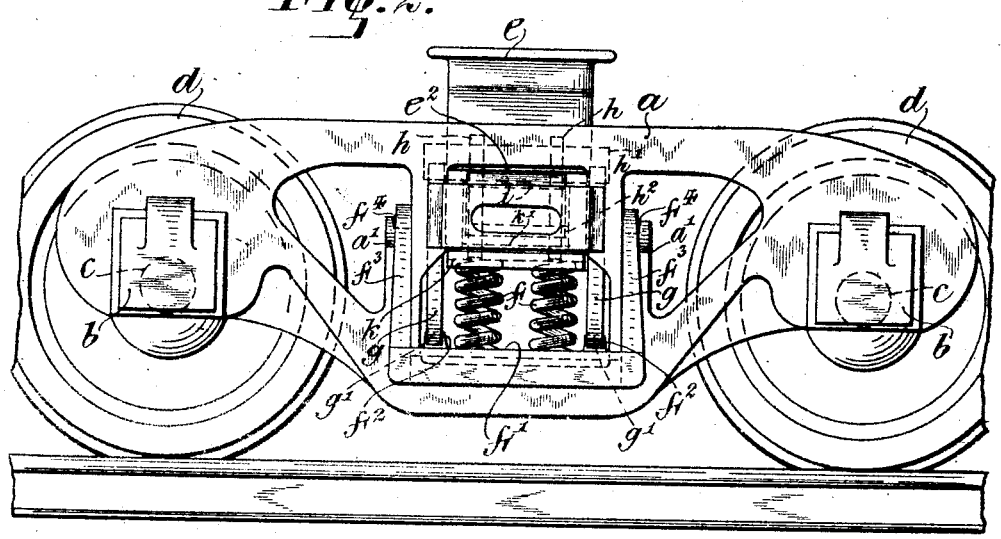
Figure 2 is a view of the truck in side elevation, the wheels being partly broken away to save space.

In the construction shown there are provided two load-distributing, co-acting levers $g$ and $g^x$, preferably of open plate construction, such that each straddles the other at one end, as shown in Figures 4 and 5, these two co-acting levers constituting the truck bolster, supporting the car body and distributing the load equally to the two sides of the truck frame. Each of the levers $g$ and $g^x$ bears at one end on the corresponding side frame of the truck, preferably through a spring supporting plate $f'$, being notched, as at $g'$ for engagement with a projection $f^2$ to prevent slipping of the lever. The plate $f'$, it will be observed, is hung by swing hangers $f^3$ from supporting points $f^4$ on the struts $a'$ of the side frame and thus permits a limited yielding to side thrust and relieves the side thrust against the rail. Each lever $g$ and $g^x$ is also notched at $g^2$ to receive a bar $h$ of a double $h'$ which carries a bottom rod $h^2$ on which is supported, in the embodiment illustrated, a lever $i$, the function of which, in this construction, is to transmit the load to the springs $f$. As shown each lever $i$ has at $i'$ a toe or projection for co-action with the bearing point $e^2$ of the body bolster $e$ and at its other end is formed, as at $i^2$, to bear on a spring plate $k$ which rests on the springs $f$, the plate $k$ having on its upper side a projection $k'$ which rises through an opening $g^3$ formed in the corresponding end of the lever $g$ or $g^x$ as the case may be. As will be observed by reference to Figure 1, some clearance is left between the plate $k$ and the under side of the lever $g$ or $g^x$ to permit relative movement in one direction, movement of the plate $k$ and of the projection $k'$ being downward with respect to the corresponding end of the lever $g$ or $g^x$ under load to compress the springs $f$. It will also be observed that under some conditions the corresponding end of the lever $g$ or $g^x$ may also be cushioned on the springs through the medium of the plate $k$. It will be observed further that the bearing point $i'$ of each secondary lever $i$ is located, with respect to the hanger $h'$, at about one-third of the distance from such hanger to the bearing point $i^2$, so that the extent of movement of the body at the bearing point $e^2$ is about one-half of the extent of movement of the secondary lever $i$ at the point where it bears on the springs.

The two levers $g$ and $g^x$ have a bearing on each other or a pivot connection, as at $g^4$, at a middle point, and one of the two levers, as the lever $g$, receives at its middle portion, the truck center plate $g^5$ which receives the center bearing $e'$ or king bolt of the body bolster $e$.

It will now be understood that the car load, applied through the center plate $g^5$, acts upon both levers $g$ and $g^x$, through their pivotal connection at $g^4$, and is distributed equally to the two sides of the truck through the springs $f$, directly through the bearing of the free end of each lever on the spring plate, each lever being fulcrumed at its other end on the opposite side frame. It will also be evident that excess of load at one side or the other of the car body will act through the corresponding contact point $e^2$ and the corresponding secondary lever $i$, one end of which will compress the corresponding springs $f$ while the other end will act upon the other lever $g$ or $g^x$ as the case may be, but through about one-half of the lever, depressing correspondingly the free end of such other lever, both levers being depressed alike at the middle portion. It will be understood, of course, that what has been said with respect to the action on the lever system of car load applies similarly with respect to the effect of track inequalities which tend to vary the height of the car axle, at one end or the other, with respect to the car body, such effect being distributed through the lever system to both sides of the car body but in diminished degree by reason of the spring action, so that whatever movement, however slight, may be imparted to the car body, is imparted at both sides alike so that there is practically no tendency to create sidesway of the car body.

It will be understood that various changes in details of construction and arrangement can be made to suit different conditions of use and the convenience of the manufacturer and that, except as pointed out in the claims, the invention is not restricted to the precise construction shown and described herein.

I claim as my invention:

1. In combination with a car body and truck, bolster levers pivotally connected at a middle point and adapted to support the car body at their middle portion, each lever fulcrumed at one side of the truck and spring supported at the other side of the truck.

2. In combination with a car body and truck, bolster levers pivotally connected at their middle point and adapted to support the car body at their middle portions, each lever fulcrumed at one side of the truck and spring supported at the other side of the truck, and means to transmit load from the car body to each lever through its spring supported portion.

3. In combination with a car body and truck, coacting bolster levers adapted to support the car body at their middle portions, each lever fulcrumed at one side of the truck and spring supported at the other side of the truck.

4. In combination with a car body and truck, coacting bolster levers adapted to support the car body at their middle portion, each lever fulcrumed at one side of the truck, a secondary lever hung from each bolster lever at its free end portion, springs supported by the truck frame and supporting each secondary lever at one end, and means to transmit load from the car body to the secondary levers.

5. In combination with a car body and truck, bolster levers pivotally connected at a middle point and adapted to support the car body at their middle portion, each lever fulcrumed at one side of the truck and spring supported at the other side of the truck, and swing hangers hung on the side frames and supporting the fulcrumed ends of the levers.

6. In combination with a car body and truck, coacting bolster levers adapted to support the car body at their middle portions, each lever fulcrumed at one side of the truck and spring supported at the other side of the truck, and swing hangers hung on the side frames and supporting the fulcrumed ends of the levers.

This specification signed this 26th day of March, A. D. 1925.

GEORGE K. THOMPSON.